United States Patent
Kawase et al.

(10) Patent No.: US 12,189,795 B2
(45) Date of Patent: Jan. 7, 2025

(54) CHATBOT CONTROL DEVICE AND CHATBOT CONTROL METHOD

(71) Applicant: WingArc1st Inc., Tokyo (JP)

(72) Inventors: Yasuhiro Kawase, Tokyo (JP); Hironori Watanabe, Tokyo (JP); Naoto Kamijo, Tokyo (JP)

(73) Assignee: WingArc1st Inc., Tokyo (JP)

( * ) Notice: Subject to any disclaimer, the term of this patent is extended or adjusted under 35 U.S.C. 154(b) by 384 days.

(21) Appl. No.: 17/573,200

(22) Filed: Jan. 11, 2022

(65) Prior Publication Data

US 2022/0222360 A1 Jul. 14, 2022

(30) Foreign Application Priority Data

Jan. 13, 2021 (JP) ................................. 2021-003191

(51) Int. Cl.
 *G06F 21/00* (2013.01)
 *G06F 21/60* (2013.01)
 *H04L 51/02* (2022.01)

(52) U.S. Cl.
 CPC ............ *G06F 21/604* (2013.01); *H04L 51/02* (2013.01)

(58) Field of Classification Search
 CPC ........ G06F 21/604; G06F 21/31; G06F 21/62; H04L 51/02; H04L 51/04
 See application file for complete search history.

(56) References Cited

U.S. PATENT DOCUMENTS

| | | | | |
|---|---|---|---|---|
| 2017/0345079 | A1* | 11/2017 | Rangan | G06F 16/951 |
| 2019/0140986 | A1* | 5/2019 | Anderson | G06F 40/279 |
| 2021/0144107 | A1* | 5/2021 | Liang | G06N 5/04 |
| 2022/0222360 | A1* | 7/2022 | Kawase | G06F 21/31 |
| 2022/0368519 | A1* | 11/2022 | Iijima | H04L 9/0618 |
| 2023/0132894 | A1* | 5/2023 | Iwasaki | H04L 51/046 |
| | | | | 709/206 |

FOREIGN PATENT DOCUMENTS

| | | | |
|---|---|---|---|
| JP | 3545573 | B2 | 7/2004 |
| JP | 2006 268125 | A | 10/2006 |

* cited by examiner

*Primary Examiner* — William A Corum, Jr.
(74) *Attorney, Agent, or Firm* — POLSINELLI PC

(57) ABSTRACT

An access restriction can be suitably imposed to a user accessing a chatbot iron an external chat system. A user mapping unit substituting external user information with internal user information with reference to a user information storage unit on the basis of external user information that is sent along with a request from an external chat system, and an execution control unit determining execution privilege of connection to a chatbot by an internal user and execution privilege of processing associated with the chatbot with reference to the execution privilege storage unit on the basis of the substituted internal user information and determining whether or not to execute processing according to the request are provided, the external user information is substituted with the internal user information, and then, it is determined whether or not the execution privilege of the connection to the chatbot and the execution privilege of the processing are granted to the internal user information, and the execution of the processing is controlled in accordance with a determination result thereof.

4 Claims, 3 Drawing Sheets

| INTERNAL USER ID | INTERNAL CONNECTION SETTING | CONNECTOR ID | EXTERNAL TENANT ID | EXTERNAL USER ID |
|---|---|---|---|---|
| U001-I | sss1 | SSS | AAA | U001-O |
| U001-I | sss2 | SSS | BBB | U001-O |
| U001-I | www | WWW | CCC | U001-O |

CHATBOT CONTROL DEVICE AND CHATBOT CONTROL METHOD

CROSS REFERENCE TO RELATED APPLICATIONS

This application claims priority to Application No. 2021-003191 filed in Japan on Jan. 13, 2021, the entire contents of which are hereby incorporated by reference.

BACKGROUND OF THE INVENTION

Field of the Invention

The present invention relates to a chatbot control device and a chatbot control method, and in particular, is preferable to be used in a system in which processing is executed in accordance with a request that is sent to a chatbot through an external chat system, and information to be obtained as a result thereof is provided to a user from the chatbot, through the external chat system.

Description of the Related Art

Recently, an automatic conversation program in which a "chat" that is a real-time communication mechanism for mainly exchanging a text in both directions and a "robot" in which a program for automatically executing a certain task on behalf of a person is built are combined, a so-called chatbot has been developed and widely used. In contrast to the chat in which people talk, to each other, in the chatbot, a person and a computer in which artificial intelligence is built talk to each other.

The chatbot is frequently used even in a business chat that is used in various assignments for business. A main object of the business chat is to smoothly perform communication in the company by using the chat instead of an e-mail, and a business chat having a function such as task management for business, schedule management, efficient information sharing, workflow management, and document automatic creation, in addition to communication for business by the chat, is also provided.

By the way, in a web system in which an information providing server provides information to a terminal device in accordance with a request from a terminal device of a user, it is general to impose an access restriction by using authentication information such as a user 10 or a password in the information providing server. The access restriction includes not only the restriction of connection itself to the information providing server from the terminal device but also the restriction of information or a function that is provided to the terminal device from the information providing server for each user. The user can access information resource of the information providing server within a range allowed by the information providing server. Such an access restriction is also usually applied to a system using the chatbot (in particular, the business chat) described above.

For example, it is known that execution privilege such as which manipulation (referring, updating, deleting, and the like) is allowed to the information stored in the information providing server or which processing among various processing items provided by the information providing server can be executed is set for each user, and use without privilege is not allowed (for example, see Patent Documents 1 and 2).

In a system described in Patent Document 1, in a case where an arbitrary button is manipulated by a user on a screen to be displayed on a Web browser of a client machine, when a request corresponding to such a manipulation is received, it is determined whether or not the user has privilege to demand the request. Here, in a case where it is determined that the user has privilege, a method corresponding to the request in a method execution unit is called out to execute processing. On the other hand, in a case where it is determined that the user has no privilege, such method calling is not performed.

In a system described in Patent Documents 2, when an information providing server receives an information acquisition request from an external user, mapping between external user information relevant to the external user and internal user information relevant to an internal user that is internally defined in advance in accordance with access privilege is created, and thus, the external user is converted to the corresponding internal user, and information resource is provided to the external user in accordance with the access privilege of the converted internal user.

Patent Document 1: Japanese Unexamined Patent Application Publication No. 2206-268125.
Patent Document 2: Japanese Patent No. 3545573.

In a case of constructing the system using the chatbot, there is a need to configure the system in cooperation with a chat system that is already widely provided (hereinafter, referred to as an external chat system). In such a case, the system accesses the internal chatbot from the external chat system, and provides the information to the user from the internal chatbot through the external chat system. For such a system, how to set the access restriction for the user becomes a problem. However, in the system described in Patent Documents 1 and 2, the access restriction with respect to the system using the chatbot is not described.

SUMMARY OF THE INVENTION

The invention has been made in order to solve the problems described above, and an object thereof is to enable an access restriction to be suitably imposed to a user accessing a chatbot through an external chat system, in a system in which the external chat system and the internal chatbot are cooperated with each other.

In order to solve the problems described above, in the invention, when receiving a request from a user that is sent to a chatbot, from an external chat system, external user information (Information relevant to an external user that is a user of the external chat system) that is sent along with the request is substituted with internal user information (information relevant to an internal user that is a user of the chatbot) with reference to a user information storage unit on the basis of the external user information. Then, execution privilege of connection to the chatbot by the internal user is determined with reference to an execution privilege storage unit on the basis of the substituted internal user information, and in a case where there is the execution privilege of the connection, execution privilege of processing associated with the chatbot is further determined, and whether or not to execute processing according to the request from the user is determined.

According to the invention configured as described above, when receiving a request with respect to a chatbot from, an external chat system, it is determined whether or not execution privilege of connection to the chatbot and execution privilege of processing associated with the chatbot are granted to internal user information substituted from external user information that is sent along with the request, and the execution of the processing is controlled in accordance with a determination result thereof. Accordingly, according to the invention, in a system in which the external chat system and the internal chatbot are cooperated with each other, it is possible to suitably impose an access restriction relevant to the connection to the chatbot or the execution of the processing through the chatbot to a user accessing the chatbot through the external chat system.

DETAILED DESCRIPTION OF THE INVENTION

First Embodiment

Figure 1:
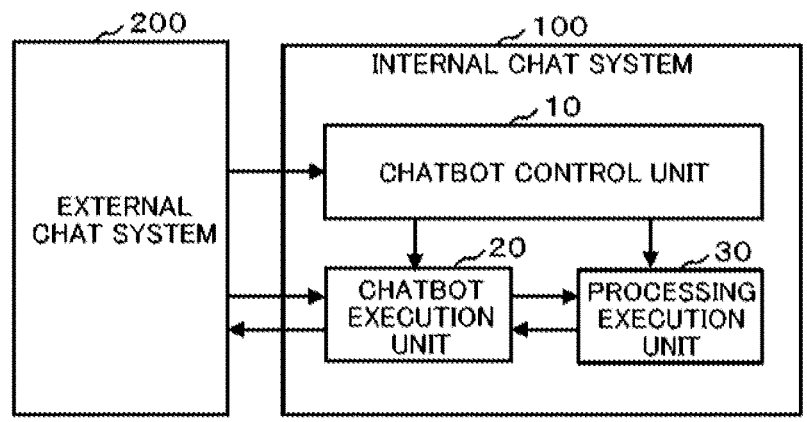
FIG. 1 is a diagram illustrating an overall configuration example of a chat system to which a chatbot control device according to a first embodiment is applied.

Hereinafter, a first embodiment of the invention will be described on the basis of the drawings. FIG. 1 is a diagram illustrating an overall configuration example of a chat system to which a chatbot control device according to the first embodiment is applied. As illustrated in FIG. 1, the chat system according to the first embodiment includes an internal chat system 100 to which the chatbot control device of this embodiment is applied, and an external chat system 200 cooperated with the internal chat system ICC. The internal chat system IOC includes a chatbot control unit 10, a chatbot execution unit 20, and a processing execution unit 30, as a function configuration.

The external chat system 200, for example, is a chat system that, is recognized and used by many users (hereinafter, a user of the external chat, system 200 is referred to as an external user). The external users can chat with each other in an information space set inside the external chat system 200 (referred to as a tenant, a workspace, or the like, and in this embodiment, represented as the information space or the tenant). In addition, the external chat system 200 may include a chatbot inside, and the external user can also chat with the chatbot.

The internal chat system 100 provides a chatting function to a user of the internal chat system 100 (hereinafter, referred to as an internal user). The internal users can chat with each other in an information space (tenant) set inside the internal chat system ICC. In addition, the internal user can also chat with the chatbot. The chatbot execution unit 20 is operated in cooperation with the processing execution unit 30 to execute processing associated with the chatbot and to provide information to be obtained as a result thereof to the internal user.

In addition the internal chat system 100 also has a function of executing processing in accordance with a request from the external user that is sent to the chatbot through the external chat system 200 and of providing information to be obtained as a result thereof to the external user from the chatbot through the external chat system 200. The information required to access the chatbot of the internal chat system 100 (including security information) is provided in advance to the external chat system. 200 from the internal chat system 200 and set in the external chat system 200. In addition, the information required to access the external chat system 200 (including security information) is provided in advance to the internal chat system 100 from the external chat system 200 and set in the internal chat system 100. The internal chat system. 100 and the external chat system 200 can be cooperated with each other by using the information set in advance as described above.

Figures 3, 4:
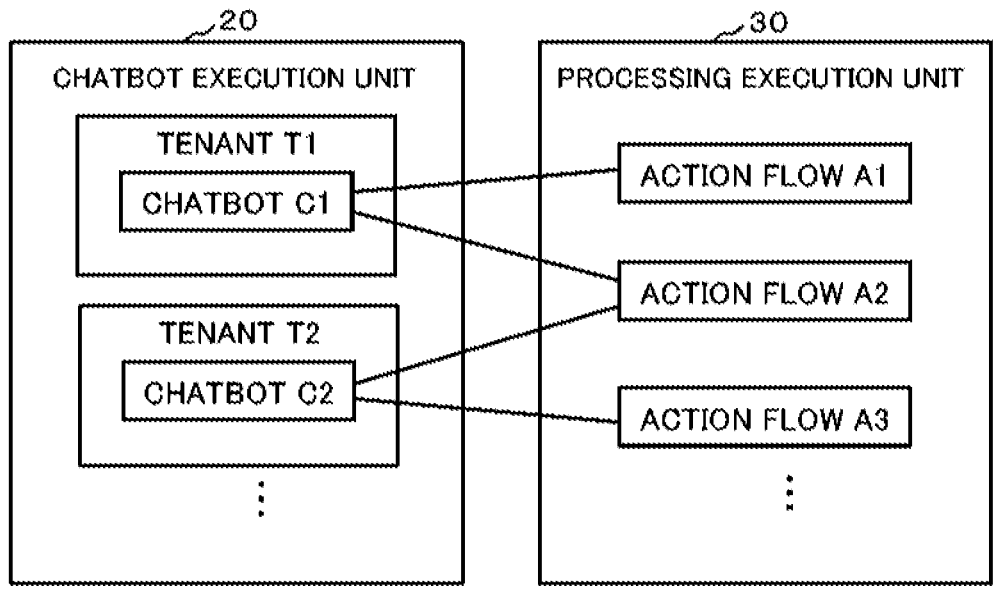
FIG. 3 is a conceptual diagram illustrating an example of a tenant, a chatbot, and an action flow.
FIG. 4 is a conceptual diagram illustrating an example of user association information that is stored in a user information storage unit.

The chatbot control unit 10 controls the operation of the chatbot execution unit 20 and the processing execution unit 30. As illustrated in FIG. 3, the chatbot execution unit 2C includes chatbots C1, C2, . . . for each of a plurality of tenants T1, T2, . . . set inside the internal chat system 100 (hereinafter, arbitrary any one tenant may be represented as a tenant T, and arbitrary any one chatbot may be represented as a chatbot C), and executes the operation of any chatbot C in accordance with the request from the internal user or the external user. In this case, the chatbot control unit 1C determines the presence or absence of execution privilege of connection to the chatbot C, and determines whether or not to execute the chatbot C.

Note that, here, in order to simplify the description, an example is described in which one chatbot C exists in one tenant T, but a plurality of chatbots may exist in one tenant T. In addition, it may be possible for the user to set a chat room in the tenants T1, T2, . . . , and to invite an arbitrary chatbot C to the chat room.

In addition, as illustrated in FIG. 3, one or a plurality of action flows A1, A2, . . . are associated with one chatbot C (hereinafter, arbitrary any one action flow may be represented as an action flow A), the processing of any action flow A is executed in accordance with the content of the request from the user that is received by the chatbot C. In this case, the chatbot control unit 10 determines the presence or absence of execution privilege of the action flow A, and determines whether or not to execute the processing by the action flow A. The plurality of action flows A1, A2, . . . define the contents of a plurality of types of processing items, and the processing execution unit 30 executes the processing in accordance with the defined contents.

Figure 2:
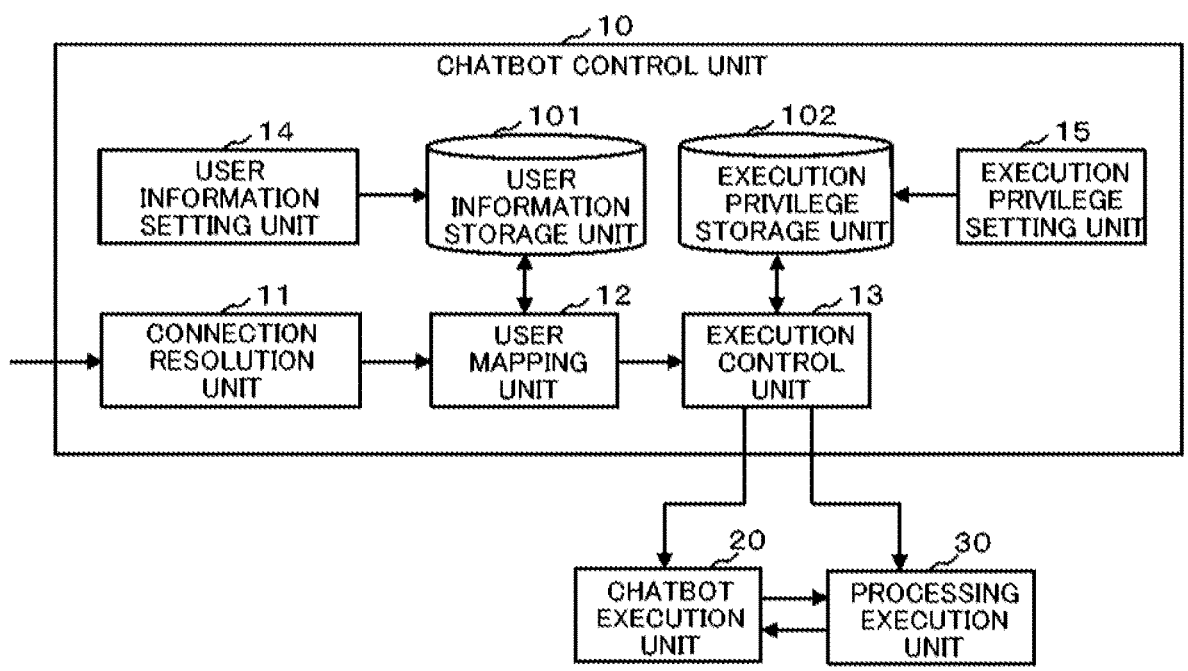
FIG. 2 is a block diagram illustrating a specific function configuration example of a chatbot control unit according to the first embodiment.

FIG. 2 is a block diagram illustrating a specific function configuration example of the chatbot control unit 10. As illustrated in FIG. 2, the chatbot control unit 10 according to the first embodiment includes a connection resolution unit 11, a user mapping unit 12, an execution control unit 13, a user information setting unit 14, and an execution privilege setting unit 15, as a function configuration. In addition, the chatbot control unit 10 according to the first embodiment includes a user information storage unit 101 and an execution privilege storage unit 102, as a storage medium.

The function blocks 11 to 15 can also be configured of any of hardware, a digital signal processor (DSP), and software. For example, in a case where each of the function blocks is configured of the software, the function blocks 11 to 15 are practically configured by including a CPU, a RAM, a ROM, and the like of a computer, and attained by operating a program stored in a recording medium such as a RAM, a ROM, a hard disk, or a semiconductor memory.

The user information setting unit 14 sets association information between external user information relevant to the external user that is the user of the external chat system 200, and internal user information relevant to the internal user that is the user of the internal chat, system 100 (the chatbots C1, C2, . . . ) (hereinafter, referred to as user association information), and stores the setting information in the user information storage unit 101.

FIG. 4 is a conceptual diagram illustrating an example of the user association information that is stored in the user information storage unit 101. As illustrated in FIG. 4, the user information storage unit 101 includes a table in which an internal user ID as the internal user information, internal connection setting information, and a connector ID are set as a primary key, and the connector ID, an external tenant ID, and an external user ID as the external user information are set as a unique key. And the user information storage unit 101 stores the internal user ID and the internal connection setting information of the internal chat system 100, and the external tenant ID and the external user ID of the external chat system 200 in association with each other for each user by using the connector ID as a common key. The user information storage unit 101 stores the user association information as illustrated in FIG. 4 for each tenant of the internal chat system 100.

The internal connection setting information is information required to connect to the internal chat system 100 from the external chat system. 200, and includes account information such as the name or the ID of the internal chat system 100, and an identifier of the chatbots C1, C2, . . . (hereinafter, referred to as a chatbot ID). The connector ID is an ID for identifying a cooperative program module that is used when the chatbots C1, C2, . . . of the internal chat system 100 perform the processing in cooperation with the external chat system 200. The external tenant ID is an ID for identifying a tenant set as the information space for the external user to access the external chat system 200 (hereinafter, referred to as an external tenant).

The internal user ID, the internal connection setting information, the external tenant ID, and the external user ID are manually set after the internal user selects a desired chatbot C through a predetermined user setting UI screen. On the other hand, in the connector ID, information stored in advance in the internal chat system 100 is set as information required to access the chatbot C from the external chat system 200 when the internal user selects the desired chatbot C through the predetermined user setting UI screen. Note that, all information items may be manually set by the user. As described above, the user association information set with respect to the chatbot C is used as information that is referred to by the execution control unit 13 when the execution of the processing is requested by an access to the chatbot C of the internal chat system. 100 from the external chat system 200.

The execution privilege setting unit IS sets information relevant to the execution privilege of the connection to the chatbots C1, C2, . . . by the internal user, and information relevant to the execution privilege of the processing of the action flows A1, A2, . . . associated with the chatbots C1, C2, . . . in association with the internal user information, and stores the setting information in the execution privilege storage unit 102.

That is, the execution privilege setting unit 15 sets to which of the chatbots C1, C2, . . . the connection is allowed by the internal user, as the execution privilege of the connection, and sets to which of the action flows A1, A2, . . . the execution of the processing is allowed, as the execution privilege of the processing. For example, in the example of FIG. 3, for a certain user U1, the execution privilege of the connection to a first chatbot C1 among the plurality of chatbots C1, C2, . . . can be set to "present", and the execution privilege of the processing with respect to the first action flow A1 among two action flows A1 and A2 associated with the first chatbot C1 can be set to "present". The chatbot C and the action flow A for which the execution privilege is not set to "present" do not have the execution privilege, respectively.

The execution privilege of the connection to the chatbots C1, C2, . . . and the execution privilege of the processing with respect to the action flows A1, A2, . . . , for example, are manually set by a management user of the internal chat system 100 through the predetermined privilege setting UI screen. Information of the execution privilege to be set for each internal user as described above is used as information to be referred to by the execution control unit 13 not only when the internal user accesses the chatbot C and requests the execution of the processing but also when the external user accesses the chatbot C of the internal chat system 100 from the external chat system 200 and requests the execution of the processing.

Note that, the execution privilege can be set for each individual user or for each group hierarchy. In a case where the execution privilege is set in the group hierarchy, the execution privilege is collectively set with respect to a plurality of users to be included in the group hierarchy.

When the execution of the processing is requested by the access to the chatbot C of the internal chat system 100 from the external chat system 200, the connection resolution unit 11 determines whether or not the connection to the internal chat system 100 from the external chat system 200 is allowed (connection setting resolution), and specifies the cooperative program module to be used when the chatbot C performs the processing in cooperation with the external chat system 200 (connector resolution).

In the first embodiment, the access to the internal chat system 100 from the external chat system 200, for example, is performed by using a Web hook. That is, in a case where the external user of the external chat system 200 posts a message with respect to the chatbot C of the internal chat system 100 on the Web hook that is prepared in advance in the external chat system 200, the posted message is transmitted along with the external user ID to the internal chat system 100, as the function of the web hook.

In this case, in uniform resource locators (URL) to be used when performing the access to the internal chat system 100 from the external chat system 200, the internal connection setting information and an internal tenant ID of the internal chat system. 100, which are stored in advance in the external chat system 200, are included. Accordingly, the connection resolution unit 11 is capable of performing the connection setting resolution by the URL received by the internal chat system 100 and of specifying which tenant T in the internal chat system 100 (hereinafter, referred to as an internal tenant) Is accessed. In addition, the connection resolution unit 11 acquires the corresponding connector ID, with reference to the user association information of the user information storage unit 101 on the basis of the internal connection setting information, and thus, specifies the cooperative program module to be used in the cooperation with the external chat system 200.

When receiving the request from the user that is sent along with the external user ID to the chatbot C of the internal chat system 100 from the external chat system 200 (the posted message for requesting a response with respect to the chatbot C), the user mapping unit 12 substitutes the external user ID with the internal user ID with reference to the user information storage unit 101 on the basis of the external user ID to be extracted from the posted message by the cooperative program module that is specified by the connector ID, (that is, acquires the internal user ID that is associated with the external user ID), after the connection setting resolution and the connector resolution is processed by the connection resolution unit 11.

The execution control unit 13 determines the execution privilege of the connection to the chatbots C1, C2, . . . , with reference to the execution privilege storage unit 102 on the basis of the internal user ID that is substituted by the user mapping unit 12. The execution control unit 13 further determines the execution privilege of the processing of the action flows A1, A2, . . . in a case where there is the execution privilege of the connection, and determines whether or not to execute the processing according to the request from the external user (the posted message). For example, an activation condition for activating the action flow when which message with which content is posted is set for each of the plurality of action flows A1, A2, . . . . The execution control unit 13 specifies which action flow A is activated by the chatbot C, on the basis of the content of the posted message, and determines whether or not there is the execution privilege of the specified action flow A.

In a case where it is determined that there is the execution privilege of the connection to the chatbot C, and there is the execution privilege of the processing by the action flow A to be activated in accordance with the posted message, the execution control unit 13 controls the operation of the chatbot execution unit 20 and the processing execution unit 30 such that executes the processing of the action flow A and provides the information to be obtained as a result thereof to the external user from the chatbot C through the external chat system 200. On the other hand, in a case where it is determined that there is no execution privilege of the connection to the chatbot C, and in a case where it is determined that there is the execution privilege of the connection to the chatbot C but there is no execution privilege of the processing by the action flow A to be activated in accordance with the posted message, the execution control unit 13 responds to the external user of the external chat system 200 that there is no execution privilege.

As described above in detail, in the first embodiment, when receiving the request from the user that is sent to the chatbots C1, C2, . . . of the internal chat system 100 from the external chat system 200, the external user ID is substituted with the internal user ID with reference to the user information storage unit 101 on the basis or the external user ID that is sent along with the request. Then, the execution privilege of the connection to the chatbots C1, C2, . . . by the internal user is determined with reference to the execution privilege storage unit 102 on the basis of the substituted internal user ID, and in a case where there is the execution privilege of the connection, the execution privilege of the processing by the action flows A1, A2, . . . associated with the chatbots C1, C2, . . . is further determined, and it is determined whether or not to execute the processing according to the request from, the external user.

According to the first embodiment configured as described above, when receiving the request with respect to the chatbots C1, C2, . . . of the internal chat system 100 from, the external chat system 200, it is determined whether or not the execution privilege of the connection to the chatbots C1, C2, . . . and the execution privilege of the action flows A1, A2, . . . associated with the chatbots C1, C2, . . . are granted to the internal user ID substituted from the external user ID that is sent along with the request, and the execution of the processing is controlled in accordance with a determination result thereof. Accordingly, according to the first embodiment, in the chat system in which the external chat system 200 and the chatbots C1, C2, . . . of the internal chat system 100 are cooperated with each other, it is possible to suitably impose an access restriction relevant to the connection to the chatbots C1, C2, . . . or the execution of the processing through the chatbots C1, C2, . . . to the external user accessing the chatbots C1, C2, . . . through the external char, system 200.

Second Embodiment

Hereinafter, a second embodiment of the invention will be described on the basis of the drawings. An overall configuration example of a chat system, to which a chatbot control device according to the second embodiment is applied is the same as that in FIG. 1. In the first embodiment described above, an example has been described in which the access to the internal chat system 100 from, the external chat system 200 is performed by using the Web hook. In contrast, in the second embodiment, the access to the internal chat system 100 from the external chat system 200 is performed by using a global web hook.

In a case of the Web hook, a URL can be set for each of the internal tenants T1, T2, . . . set in the internal chat system 100 to one external chat system 200. Accordingly, the connection resolution unit 11 is capable of specifying to which internal tenant T an access is performed by only checking the URL received by the internal chat system 100. In contrast, in a case of the global web hook, only one URL of the internal chat system ICC can be set to one external chat system. 200, and the URL can not be set for each of the internal tenants T1, T2, . . . . Accordingly, in the second embodiment, it is necessary to specify to which internal tenant T an access is performed from the external chat system 200 (tenant resolution).

Figures 5, 6:
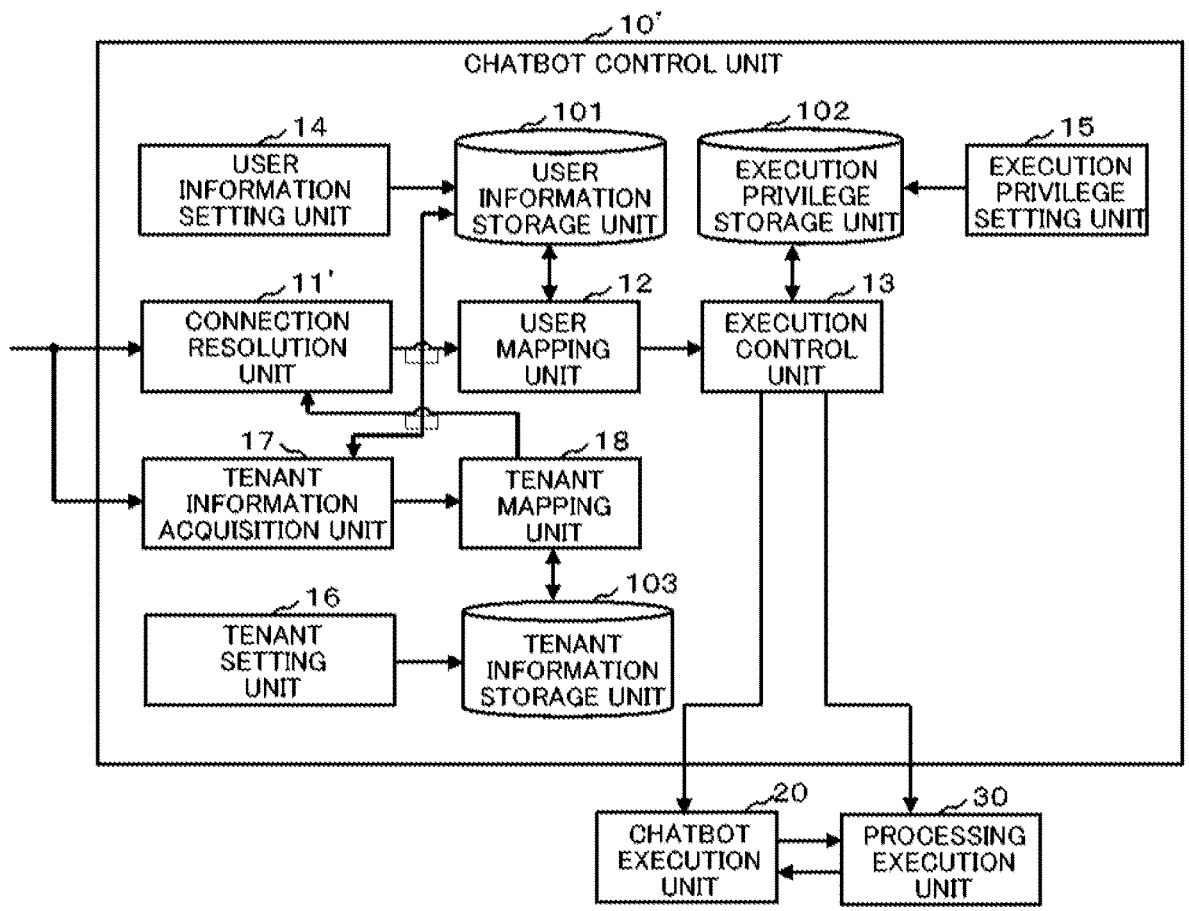
FIG. 5 is a block diagram illustrating a specific function configuration example of a chatbot control unit according to a second embodiment.
FIG. 6 is a conceptual diagram illustrating an example of tenant association information to be stored in a tenant information storage unit.

FIG. 5 is a block diagram, illustrating a function configuration example of a chatbot control unit 101 according to the second embodiment. In FIG. 5, since the configurations of the same reference numerals as those illustrated in FIG. 2 have the same functions, the repeated description thereof will be omitted. As illustrated in FIG. 5, the chatbot control unit 10' according to the second embodiment further includes a tenant setting unit 16, a tenant information acquisition unit 17, and a tenant mapping unit 18, as the function configuration, and includes a connection resolution unit 11' instead of the connection resolution unit 11. In addition, the chatbot control unit 10' according to the second embodiment further, includes a tenant information storage unit 103, as the storage medium.

The tenant setting unit 36 sets association information between external tenant information relevant to the external tenant set as the information space for the external user to access the external chat system 200 and internal tenant information relevant to the internal tenant, set inside the internal chat system 100 as an information space in which the chatbots C1, C2, . . . exist (hereinafter, referred to as tenant association information), and stores the setting information in the tenant information storage unit 103.

FIG. 6 is a conceptual diagram illustrating an example of the tenant association information that is stored in the tenant information storage unit 103. As illustrated in FIG. 6, the tenant information storage unit 103 includes a table in which the internal tenant ID as the internal tenant information, and the connector ID are set as a primary key, and the connector ID, and the external tenant ID as the external tenant information are set as a unique key. And the tenant information storage unit 103 stores the internal tenant ID of the internal chat system 100 and the external tenant ID of the external chat system 200 in association with each other for each of the internal tenants by using the connector ID as a common key. The tenant information storage unit 103 stores the tenant association information as illustrated in FIG. 6 as central database exceeding the tenant.

In the internal tenant ID, information stored in advance in the internal chat system 100 is set. In addition, in the connector ID, the information stored in advance in the internal chat system 100 is set as the information required for the access from the external chat system 200. On the other hand, the external tenant ID is manually set by the internal user through the predetermined tenant setting UI screen. Note that, all information may be manually set by the user. When the execution of the processing is requested by the access to the chatbot C of the internal chat system 100 from the external chat system 200, the tenant association information set as described above is used as information that is referred to by the tenant mapping unit 18.

When receiving the request from the user that is sent along with the external user ID to the chatbot from the external chat system 200, the tenant information acquisition unit 17 acquires the external tenant ID with reference to the user information storage unit 101 on the basis of the external user 3D.

As described above, in the second embodiment, the access to the internal chat system 100 from the external chat system 200 is performed by using the global web hook. That is, in a case where the external user of the external chat system 200 posts a message with respect to the chatbot C of the internal chat system 100 on the global web hook prepared in advance in the external chat system 200, the posted message is transmitted along with the external user ID to the internal chat system ICC, as the function of the global web hook.

In this case, the URL to be used when accessing the internal chat system 100 from the external chat system 200 is a static address, and does not includes the internal connection setting information and the internal tenant ID, unlike the first embodiment. The tenant information acquisition unit 17 acquires the corresponding connector ID by specifying the internal connection setting information included in the chatbot ID, and acquires the external tenant ID associated with the internal connection setting information, with reference to the user information storage unit 101 on the basis of the chatbot ID included in the posted message that is received by the internal chat system 100.

The tenant mapping unit 38 substitutes the external tenant ID with the internal tenant. ID, with reference to the tenant information storage unit 103 on the basis of the external tenant ID that is acquired by the tenant information acquisition unit 17. The tenant mapping unit 18 provides the substituted internal tenant ID to the connection resolution unit 11'. The connection resolution unit 11' performs the tenant resolution by using the internal tenant ID supplied from the tenant mapping unit 18.

As described above, according to the second embodiment, even in the chat system in which the URL may not be set for each of the plurality of tenants T1, T2, . . . of the internal chat system 100 to one external chat system 200, it is possible to suitably impose the access restriction relevant to the connection to the chatbots C1, C2, . . . and the execution of the processing through the chatbots C1, C2, . . . to the external user accessing the chatbots C3, C2, . . . through the external chat system 200.

Note that, in the first, embodiment and the second embodiment described above, an example has been described in which the chatbots C1, C2, . . . and the action flows A1, A2, . . . are operated in accordance with the request from the external chat system 200, and the external chat system 200 is responded with the information to be obtained as a result of the processing, but the invention is not limited thereto. For example, the processing that is executed by the chatbots C1, C2, . . . may include push processing of providing information to be obtained as a result of executing a predetermined event having no relationship with the request from the external user as a trigger to the external chat system 200. For example, when detecting a predetermined slate by using a detected signal of a sensor or the like, processing of transmitting a message for notifying the external user of the detection from chatbots C1, C2, . . . may be performed. Alternatively, push processing of automatically transmitting a message generated by the chatbot C may be performed every time when it is timing set in advance.

In a case of performing such push processing, for example, the message generated by the chatbot C may be posted on a specific chat room set in advance in the external chat system 200. Alternatively, the message generated by the chatbot C may be posted on the external chat system 200 by the chatbot C designating the external user ID. As another example, the user mapping unit 12 may substitute the internal user ID with the external user ID with reference to the user information storage unit 101, and the chatbot execution unit 20 may access the external chat system 200 from, the internal chat system 100 by using the external user ID substituted oy the user mapping unit 12.

For the push processing, the execution control unit 13 may constantly allow the execution of the chatbot execution unit 2C and the processing execution unit 30 without imposing a restriction by the execution privilege of the chatbots C1, C2, . . . and the action flows A1, A2, . . . . In this manner, the restriction by the execution privilege can be imposed when accessing the internal chat system 100 from, the external chat system 200, whereas the restriction by the execution privilege may not be imposed when accessing the external chat system 200 from the internal chat system 100.

In addition, the first embodiment and the second embodiment are merely an example of embodiment foe implementing the invention, and the technical scope of the invention is not construed to a limited extent by embodiments. That is, the invention can be implemented in various forms without departing from the gist or the main features thereof.

What is claimed is:

1. A chatbot control device, controlling an operation of a chatbot in a system in which information processing is executed in accordance with a request from an external user that is sent to the chatbot through an external chat system, and information to be obtained as a result thereof is provided to the external user from the chatbot through the external chat system, the chatbot control device comprising:
    a user information storage unit storing association information between an external user information relevant to the external user that is a user of the external chat system and an internal user information relevant to an internal user that is a user of the chatbot, and storing information relevant to an association between external tenant information relevant to an external tenant which is an information space for the external user to access the external chat system wherein the external tenant is the information space to execute chat processing related to chats and the external user information;

an execution privilege storage unit storing information relevant to an execution privilege of a connection to the chatbot by the internal user and information relevant to the execution privilege of the information processing associated with the chatbot in association with the internal user information;

a user mapping unit substituting the external user information with the internal user information with reference to the user information storage unit on the basis of the external user information when receiving the request from the external user that is sent to the chatbot from the external chat system along with the external user information; and an execution control unit determining the execution privilege of the connection to the chatbot with reference to the execution privilege storage unit on the basis of the internal user information that is substituted by the user mapping unit, further determining the execution privilege of the information processing when there is the execution privilege of the connection, and determining whether or not to execute the information processing according to the request from the external user;

a tenant information storage unit storing association information between the external tenant information and internal tenant information relevant to an internal tenant which is the information space in which the chatbot exists;

a tenant information acquisition unit acquiring the external tenant information with reference to the user information storage unit on the basis of the external user information when receiving the request from the external user that is sent to the chatbot from the external chat system along with the external user information;

a tenant mapping unit substituting the external tenant information with the internal tenant information with reference to the tenant information storage unit on the basis of the external tenant information acquired by the tenant information acquisition unit; and hardware having instructions that implements the user information storage unit, the execution privilege storage unit, the user mapping unit, the execution control unit, the tenant information storage unit, the tenant information acquisition unit, and the tenant mapping unit.

2. A chatbot control method for a chatbot control device to control an operation of a chatbot with reference to a user information storage, an execution privilege storage unit and a tenant information storage unit in a system in which information processing is executed in accordance with a request from an external user that is sent to the chatbot through an external chat system, and information to be obtained as a result thereof is provided to the external user from the chatbot through the external chat system, wherein the user information storage unit stores association information between external user information relevant to the external user that is a user of the external chat system and an internal user information relevant to an internal user that is a user of the chatbot, and stores information relevant to an association between external tenant information relevant to an external tenant which is an information space for the external user to access the external chat system wherein the external tenant is the information space to execute chat processing related to chats and the external user information;

the execution privilege storage unit stores information relevant to an execution privilege of a connection to the chatbot by the internal user and the information relevant to the execution privilege of the information processing associated with the chatbot in association with the internal user information;

the tenant information storage unit stores association information between the external tenant information and internal tenant information relevant to an internal tenant which is the information space in which the chatbot exists;

the method comprising:

a first step of allowing a user mapping unit of the chatbot control device to substitute the external user information with the internal user information with reference to the user information storage unit on the basis of the external user information and allowing a tenant information acquisition unit of the chatbot control device to acquire the external tenant information with reference to the user information storage unit on the basis of the external user information, when receiving the request from the external user that is sent to the chatbot from the external chat system along with the external user information;

a second step of allowing a tenant mapping unit of the chatbot control device to substitute the external tenant information with the internal tenant information with reference to the tenant information storage unit on the basis of the external tenant information by the tenant information acquisition unit;

a third step of allowing an execution control unit of the chatbot control device to determine the execution privilege of the connection to the chatbot with reference to the execution privilege storage on the basis of the internal user information that is substituted by the user mapping unit, to further determine the execution privilege of the information processing when there is the execution privilege of the connection, and to determine whether or not to execute the information processing according to the request from the external user; and wherein hardware having instructions implements the user information storage unit, the execution privilege storage unit, the tenant information storage unit the user mapping unit, the tenant information acquisition unit the tenant mapping unit, and the execution control unit.

3. The chatbot control device according to claim 1, wherein the information processing that is executed by the chatbot include push processing of providing information to be obtained as a result of executing a predetermined event having no relationship with the request from the external user as a trigger to the external chat system, and the execution control unit constantly allows execution of the chatbot with respect to the push processing without imposing a restriction by the execution privilege.

4. The chatbot control device according to claim 3, wherein the user mapping unit substitutes the internal user information with the external user information and performs an access to the external chat system from the chatbot by using the substituted external user information when performing the push processing.

* * * * *